United States Patent [19]

Takai

[11] 4,337,487
[45] Jun. 29, 1982

[54] MAGNETIC RECORDING/REPRODUCING APPARATUS

[75] Inventor: Kazuki Takai, Toda, Japan

[73] Assignee: Clarion Co., Ltd., Japan

[21] Appl. No.: 132,658

[22] Filed: Mar. 21, 1980

[30] Foreign Application Priority Data

Mar. 23, 1979 [JP] Japan ............................ 54-036892[U]
Mar. 27, 1979 [JP] Japan ............................ 54-038830[U]

[51] Int. Cl.³ ...................... G11B 15/18; G11B 17/00
[52] U.S. Cl. ..................................... 360/71; 360/96.5; 360/93
[58] Field of Search ................ 360/71, 93, 137, 96.5, 360/96.6; 179/6.3 CC; 235/479, 483, 482; 240/197, 179; 340/146.3 H; 308/36.1

[56] References Cited

U.S. PATENT DOCUMENTS

| | | | |
|---|---|---|---|
| 3,731,062 | 5/1973 | Reilly | 340/146.3 H |
| 3,893,184 | 7/1975 | Ishigami | 242/197 |
| 3,964,096 | 6/1976 | Matsuyama | 360/71 |
| 4,071,859 | 1/1978 | Sami | 360/96.5 |
| 4,087,841 | 5/1978 | Tanaka | 360/71 |
| 4,087,844 | 5/1978 | Takahashi | 360/93 |
| 4,216,508 | 8/1980 | Hunter | 360/93 |
| 4,224,647 | 9/1980 | Umezawa | 360/71 |

Primary Examiner—Robert M. Kilgore
Attorney, Agent, or Firm—Wallenstein, Wagner, Hattis, Strampel & Aubel

[57] ABSTRACT

A magnetic recording/reproducing apparatus adapted to effect lowering and raising of a tape pack receiving frame to set it into and eject it from a recording/reproducing position. A rack portion is formed on a slide member interlocked with the tape pack receiving frame. A support link provided with a gear, which is adapted to be driven by a motor, is disposed in relation with the rack portion. An electromagnetic mechanism energized by a signal for ejection such as a tape-end signal is provided for the support link. The gear and the rack portion are adapted to engage with each other upon energization of the electromagnetic mechanism for carrying out an ejecting operation.

6 Claims, 9 Drawing Figures

MAGNETIC RECORDING/REPRODUCING APPARATUS

BACKGROUND OF THE INVENTION

1. Field of the Invention

This invention relates to a magnetic recording/reproducing apparatus. More particularly, the invention relates to a magnetic recording/reproducing apparatus having an automatic eject mechanism which is capable of loading a tape pack by a relatively light operating force and yet capable of effecting an eject operation by a relatively simple structure without applying an excessive load onto a motor and further relates to a magnetic recording/reproducing apparatus having a lever operating mechanism which is capable of being arranged within a small space, providing a desired stroke, assuring a uniform efficiency irrespectively of the position and capable of forming desired operational relations according to necessity.

2. Description of the Prior Art

There have been proposed various mechanisms for carrying out automatic ejection. Most of these mechanisms employ resilient members such as springs for automatically carrying out an ejecting operation. An ejecting energy is stored by the resilient member at the time of loading of a tape pack and discharged for ejection. These mechanisms, however, require storing of the ejecting energy at the time of tape pack loading so that the load applied during the tape pack loading is very high. This is not desirable especially for a magnetic recording/reproducing apparatus adapted for a cassette type tape pack (hereinafter referred to as "cassette") in that the loading of the cassette cannot always be effected smoothly because the cassette is small and thin. In the magnetic recording/reproducing apparatus, it is also necessary, to establish locking of a recording/reproducing mode when the cassette is loaded into a recording/reproducing position, against such a strong ejecting force. Therefore, a locking mechanism should have a considerably strong force as well as a considerable strength. The mechanism should therefore be large and heavy. By these reasons, employment of a motor has been proposed. In this case, however, a cam member for operating the motor should be large to obtain a necessary operating stroke. Thus, there is a disadvantage in space efficiency.

On the other hand, the known magnetic recording/reproducing apparatus has operating levers or links which are generally adapted to be rotated for operation. The stroke is determined depending on the length of a link arm and therefore the link should be large when a long operating stroke is required, but the link cannot be so small because of the operation efficiency even where the stroke may be short. Thus, it has been difficult to obtain a desired lever operating mechanism adapted for various conditions and requirements and enhancing the efficiency.

OBJECTS OF THE INVENTION

It is therefore an object of the present invention to provide a magnetic recording/reproducing apparatus which is capable of obviating the defects and disadvantages involved in the known magnetic recording/reproducing apparatus.

It is a specific object of the present invention to provide a magnetic recording/reproducing apparatus having a mechanism which is capable of accomplishing a lever operation for automatic ejection and manual ejection readily and accurately by a simple structure.

It is another specific object of the present invention to provide a magnetic recording/reproducing apparatus having a lever operating mechanism capable of being arranged within a space, providing a desired stroke, assuring a uniform efficiency irrespectively of the position and capable of forming desired operational relations according to necessity.

SUMMARY OF THE INVENTION

In accordance with the present invention, there is provided a magnetic recording/reproducing apparatus which comprises:

a tape pack receiving frame;

a means for setting said tape pack receiving frame into a recording/reproducing position within said apparatus;

a slide member interlocked with said tape pack receiving frame;

a rack portion formed on said slide member;

a support link for mounting a gear thereon;

a motor for driving said gear;

a means for generating a signal at the end of a tape encased within the tape pack;

an electromagnetic means adapted to be energized by said signal to drive said support link for engaging said gear with said rack portion; and a means for letting said slide member return through engagement of said gear with said rack to reset said tape pack receiving frame from said recording/reproducing position.

DESCRIPTION OF THE PREFERRED EMBODIMENT

Figure 1:
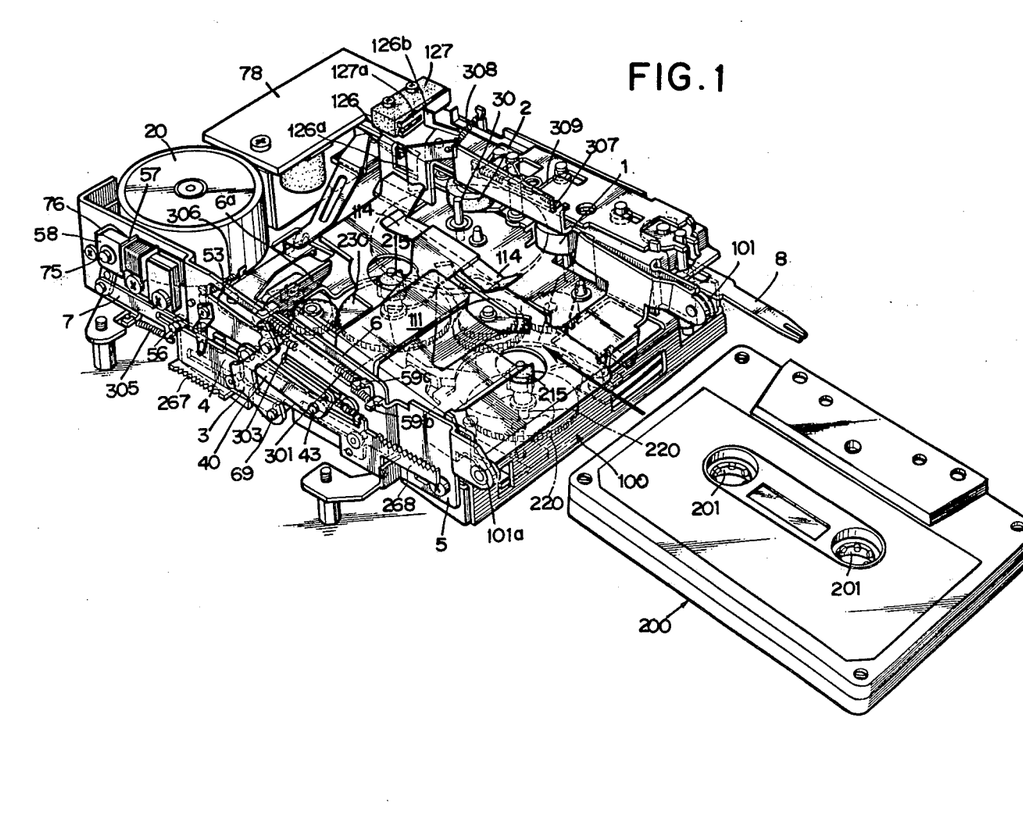
FIG. 1 is a perspective view of an entire structure of a magnetic recording/reproducing apparatus according to the present invention and a tape pack.

The invention will now be described referring to the drawings. A deck 100 bent downwardly at a forward portion thereof has a pivotal seat portion 101 at a forward, side portion thereof as illustrated in FIG. 1. A guide member 5 fixed to another side of the deck 100 also has a pivotal seat portion 101a at a forward position thereof opposite to the pivotal seat portion 101. A cassette receiving frame 10 bent upwardly at side portions thereof to define a guide portion therebetween is pivotally connected, at a forward portion thereof, to the portions 101 and 101a. The cassette receiving frame 10 has a construction as explodedly illustrated in FIG. 6. A rigid press member 111 and a thin resilient press member 112 are superposed and fixed to one side portion of the cassette receiving frame 10. The press member 111 is bent in an L-shape as illustrated in the figures, and the resilient press member 112 has a receiving resilient press portion 113 formed in the vicinity of a cassette receiving inlet and intermediate resilient press portions 114 and 114 formed at a portion extending beyond a tip end of the press member 111, so as to resiliently press a cassette 200 inserted into the guide portion against a base of the cassette receiving frame 10.

Figure 6:
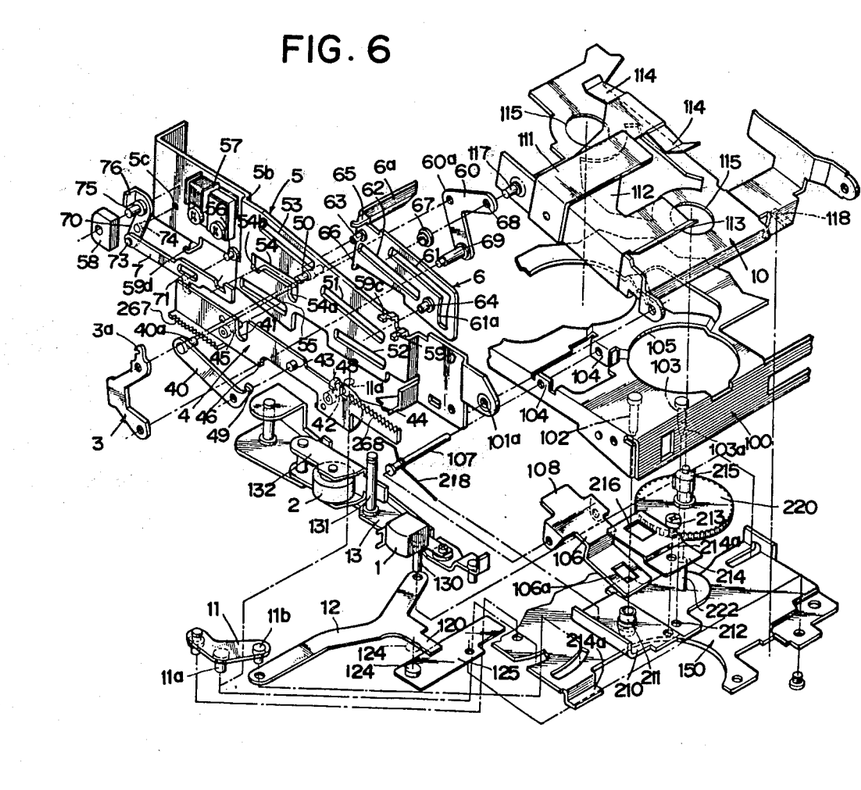
FIG. 6 is an exploded perspective view of main components of the apparatus.

The base portion of the cassette receiving frame 10 has openings 115 for receiving reel drive members 215 therein respectively. The cassette receiving frame 10 has, at a forward, side portion thereof, a hanging portion 118 bent downwardly and, at a rear, opposite side portion thereof, a pin 117. A tip end portion of the pin 117 engages with a first engaging slot 61 of a slide member 6 which is attached to the guide member 5. As can be seen from FIG. 6, the pin 117 extends through an opening formed at one end portion of an L-shaped actuating member 60 which is interposed between the upright portion of the cassette receiving frame 10 and the slide member 6. A roller 67 is loosely fitted around the pin 117 between the L-shaped actuating member 60 and the slide member 6 so as to reduce friction between the slide member 6 and the actuating member 60. The first engaging slot 61 of the slide member 6 is crooked at a forward portion 61a thereof to be formed into an L-shape as illustrated in FIG. 6. The slide member 6 further has a second engaging slot 62 as illustrated in the figure, which is engaged with one end portion of a pin 50 provided at an intermediate position of the guide member 5 so as to project from opposite faces thereof. The end portion of the pin 50 is fitted in a pivotal hole 60a which is formed at a corner portion of the actuating member 60. A rear end portion of the slide member 6 is bent horizontally to form an L-shaped receiving portion 6a. A pin 64 engaging with a first guide slot 51 formed at a forward portion of the guide member 5 is provided at a position on a line extended from the second engaging slot 62 in a longitudinal direction thereof. Another pin 63 is further provided on the guide member 5 at a rear end portion thereof so as to engage with a third guide slot 53 formed at a rear, upper portion of the guide plate 5. The guide slots 51 and 53 gently slope up in rearward directions. An engaging projection 66 is formed at a rear, lower portion of the slide member 6 and is adapted to engage with and disengage from an engaging member 40a of another actuating member 40.

Figures 2, 3, 4:
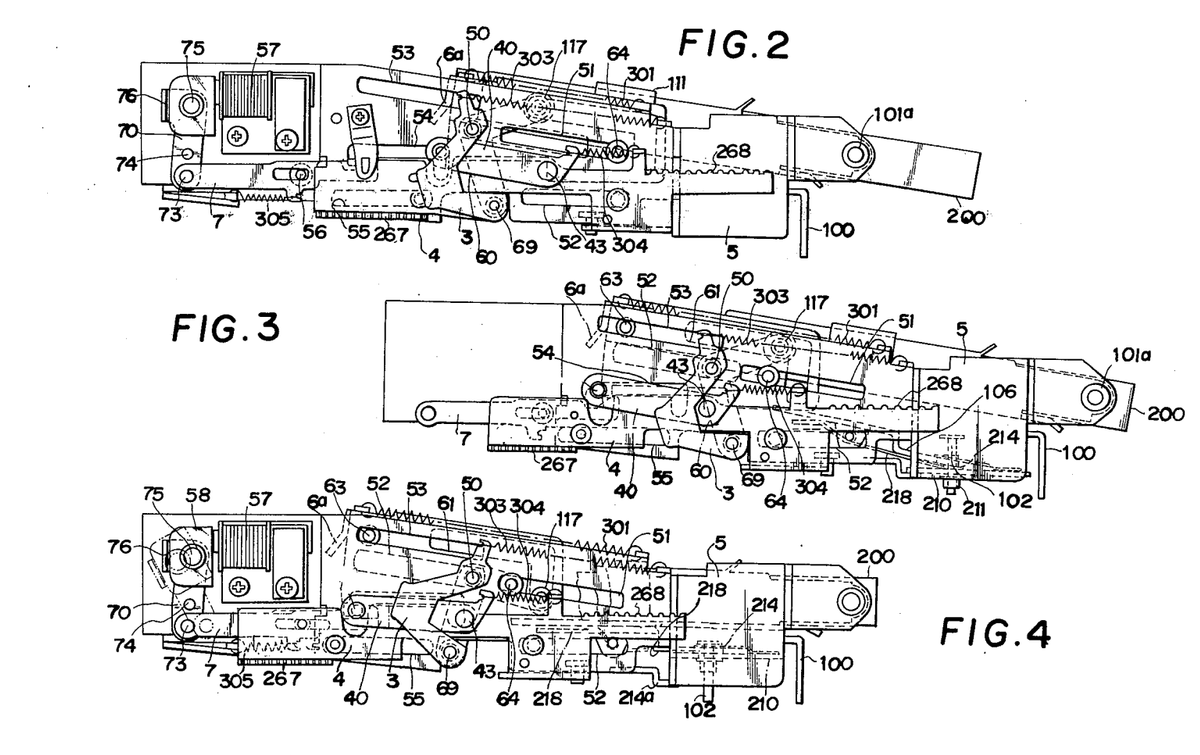
FIG. 2 is a side elevational view of the magnetic recording/reproducing apparatus and the tape pack at an early stage of its loading.
FIG. 3 is a similar side elevational view of the apparatus and the tape pack which has been loaded into the rearmost position, keeping an inclined condition.
FIG. 4 is a similar side elevational view of the apparatus and the tape pack which has been lowered onto a deck.

The guide member 5 further has, at a forward, lower portion thereof, a second guide slot 52 and, at rear, lower portions thereof, fourth and fifth guide slots 54 and 55. The second guide slot 52 and the fifth guide slot 55 receive pins 42 and 45 therein, respectively, which are provided respectively at rear and forward portions of another slide member 4 acting as an operating member in the mechanism of this invention, attached to an outer, lower portion of the guide member 5, so as to guide the sliding of the slide member 4. The fourth guide slot 54 has guide portions 54a and 54b extending downwardly at forward and rearward portions of the slot 54 respectively and engaged with the engaging member 40a formed at a rear end portion of the actuating member 40 which is rotatably attached to the outside of the slide member 4 by a pivot 43. The slide member 4 has a cut out portion 41 formed at the upper edge thereof so as to allow the engaging member 40a engaged with the fourth guide slot 54 to move up and down around the pivot 43 and to lock the engaging member 40a at its retired position. The slide member 4 has, at a forward portion thereof, a horizontal cam portion 44 in parallel with the base of the deck 100 and, at a lower portion thereof, a lock portion 46 projected downwardly. A spring 304 is provided between a spring rest 48 formed at a forward, upper portion of the slide member 4 and a spring rest 49 formed at a forward portion of the actuating member 40, as illustrated in FIGS. 2 to 4.

A connecting member 69 provided at a lower portion of the L-shaped actuating member 60 is connected to a lower portion of an interlocking member 3 crooked at an intermediate portion thereof and disposed at a position outer than the actuating member 40. An upper portion of the interlocking member 3 is pivotally supported by a pin 50 of the guide member 5. A spring 303 is provided between a spring rest 3a formed so as to extend upwardly from such a pivotal support portion and a second spring rest 59b of the guide member 5. The guide member 5 has a stepped portion 5b at a rear portion thereof. An electromagnetic mechanism 57 is fixed at a position rearward of the stepped portion 5b, and a pin 56 FIG. 2 is provided under the electromagnetic mechanism 57 so as to engage with a guide slot 71 of an interlocking link 7. A portion of the interlocking link 7, which is formed forwardly of the stepped portion 5b and inside of the guide member 5, has a lock portion 72 formed in a recess so as to engage with the rear engaging member 45 of the slide member 4. A rear end portion of the interlocking link 7 is connected to a lower end of a magnetic member mounting member 70 by a connecting member 73. A pivot 74 projected inwardly intermediate between the ends of the mounting member 70 is inserted in a hole 5c formed at a rear portion of the guide member 5. A shaft 75 provided at an upper portion of the mounting member 70 carries a magnetic member 58 so as to allow tilting of the member 58. A stopper 76 is formed in the vicinity of the shaft 75 so as to prevent the magnetic member 58 from being tilted too much around the shaft 75.

Figure 5:
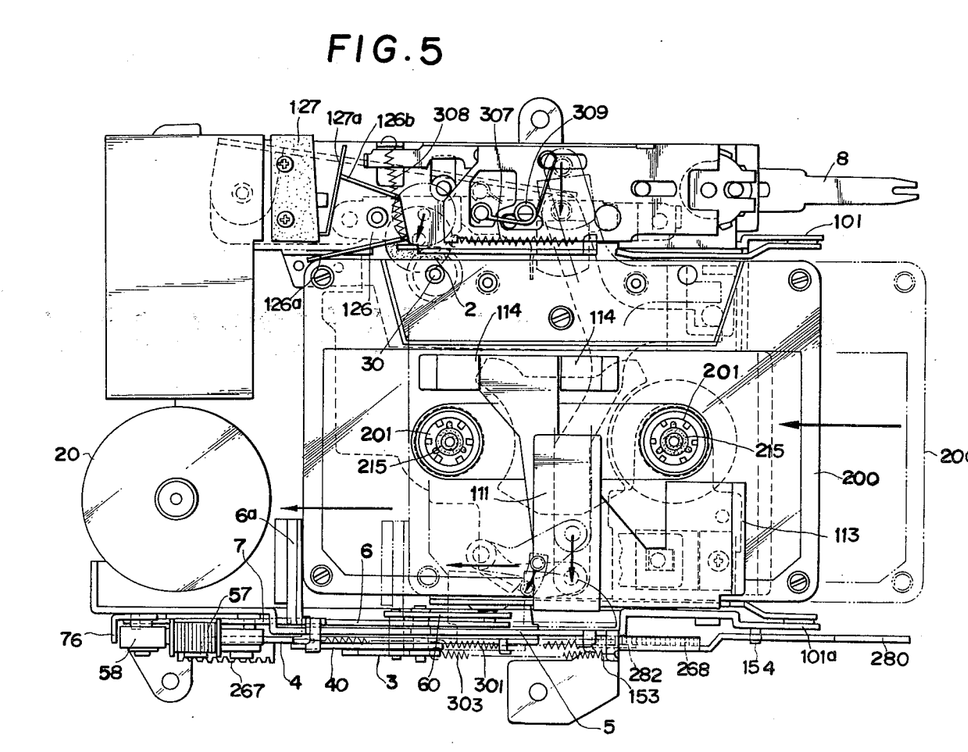
FIG. 5 is a plan view of the apparatus and the tape pack illustrated in FIG. 4.

The cam portion 44 of the slide member 4 is engaged with a pin 11a provided at an intermediate portion of a rotating member 11 pivotally connected at one end thereof to an auxiliary deck 150 attached to the lower face of the deck 100. A tip end of the rotating member 11 is provided with a connecting member 11b for connecting one end of an interlocking member 12. Another end of the interlocking member 12 is connected to a pin 130 provided on a head plate 13 mounting a head 1 thereon. A tip end of a pinch roller holder 132 mounting a pinch roller thereon abuts against a shaft 131 provided so as to stand at an intermediate position of the head plate 13. The shaft 131 is provided with a spring 133 as illustrated in FIGS. 1 and 5. The spring 133 acts to normally push the head plate 13 and a free end of the pinch roller holder 132. The interlocking member 12 has a projected portion 120 formed at an intermediate position thereof. The projected portion 120 abuts against an engaging member 134 provided on a resilient member 125 which is attached at one end thereof to the lower face of the auxiliary deck 150. The resilient member 125 is disposed under the lower face of the cassette receiving frame 10 in relation with the hanging portion or operating portion 118 formed at a position suitably spaced from the pivotal seat portion 101, so that when the frame 10 is lowered, the resilient member 125 is pressed downwardly to release abutment between the engaging member 124 and the projected portion 120.

Two guide shafts 102 and 103 are on the lower face of the deck 100 at positions near the cassette receiving inlet. The guide shafts 102 and 103 are fitted in a reel base support 210 as illustrated in FIG. 6. More specifically, one of the guide shafts 102 is received in a cylindrical guide 211 provided on the reel base support 210 for guiding up and down movement of the support 210, while another guide shaft 103 is just inserted in an opening 212 for preventing the support 210 from being rotated when the support 210 is lowered and raised. A reel base 220 having a reel drive member 215 is rotatably supported at a shaft 222 thereof by one end of the reel base support 210. A lock plate 214 is fixed to the reel base support 210 by a screw 213. The lock plate 214 has an opening 216 at a position rear of a stepped portion 214a. A tip end portion of an operating member 106 pivotally connected, at one sided position, by a pin 107, to pivotal seats 104 and 104 formed at positions near a reel base mounting opening 105. More specifically, a square slot 106a formed at this tip end portion of the operating member 106 is superposed on the opening 216 so as to insert the guide 211 and the guide shaft 102 therethrough. A base end 108 of the operating member 106 is exposed over the deck 100 at a position interior of the pivotal seats 104 and 104 and located under the lower face of the cassette receiving frame 10.

A switch actuating member 126 is rotatably provided at the interior of the deck 100 and urged by a spring 308 so that a receiving portion thereof may project into a rear portion of a cassette receiving area. An operating portion 126b of the switch actuating member 126 is disposed in relation with an operating portion 127a of a switch 127. Another reel base 230 (FIG. 1) is provided so as to oppose to the reel base 220. A magnetic member 231 is provided on the reel base 230 (FIG. 1) and a reed switch is attached to the magnetic member for detecting rotation of the reel base 230. A signal of stop of the rotation of the reel base 230 operates a transistor on a printed board 78 as illustrated in FIG. 1 to open an electrical circuit for the electromagnetic mechanism 57.

Figure 7:
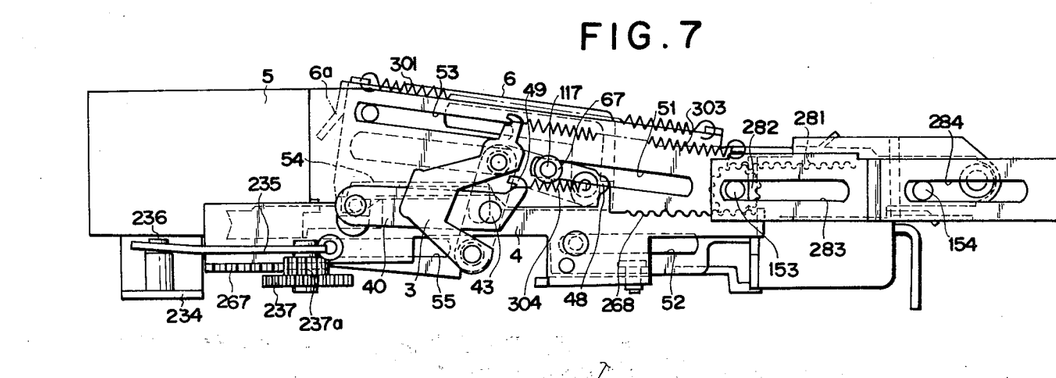
FIG. 7 is a side elevational view showing an automatic ejecting mechanism and a lever operating mechanism.
Figure 8:
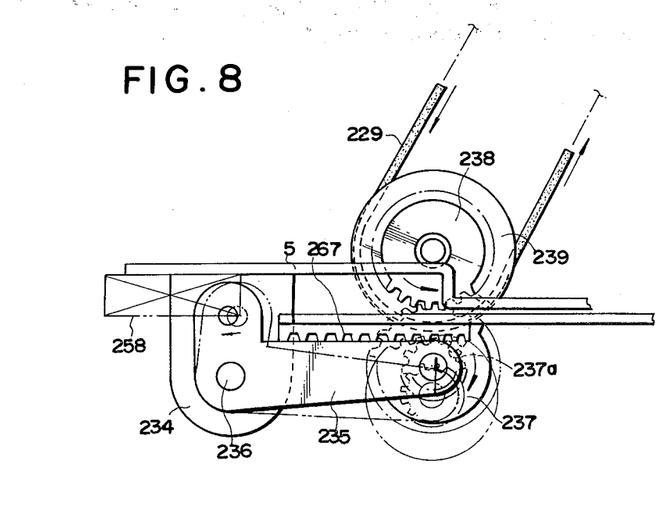
FIG. 8 is a plan view of the mechanisms shown in FIG. 7.
Figure 9:
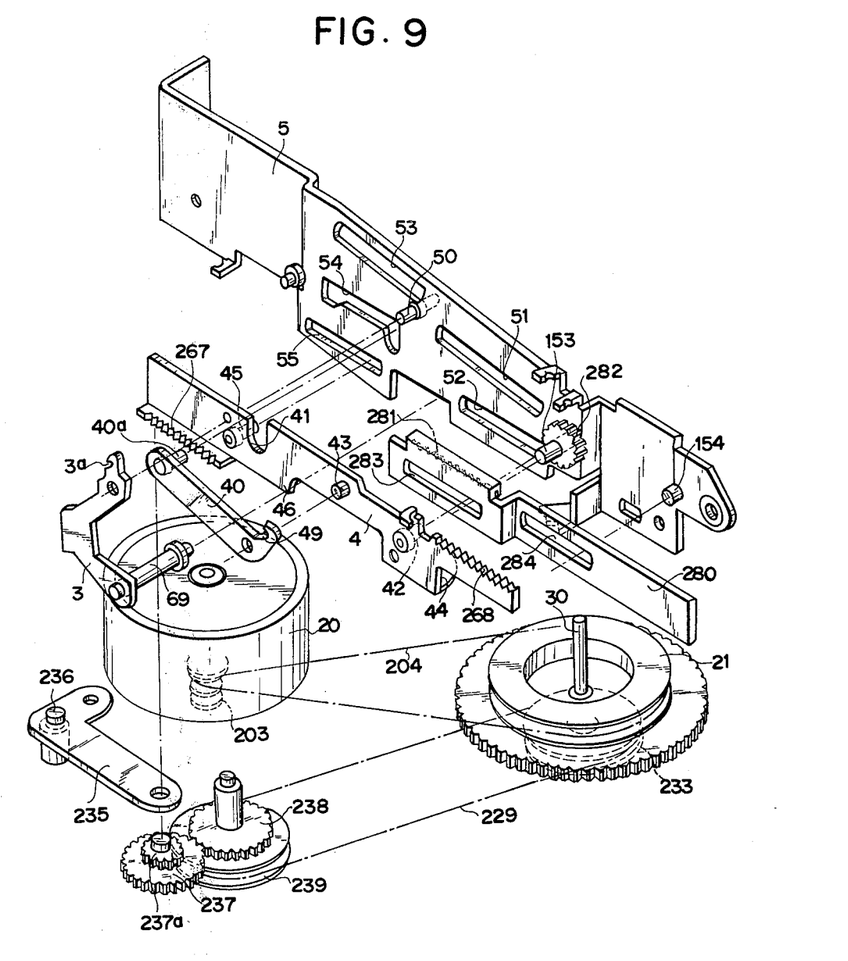
FIG. 9 is an exploded perspective view of components of the mechanisms.

In the embodiment as illustrated, the slide member 4 is adapted to be ejected by a motor 20. More specifically, as illustrated in FIGS. 7 to 9, a pulley portion 233 is provided coaxially with a flywheel 21 driven by the motor 20. An S-shaped support link 235 is pivotally supported, at a corner portion 236 thereof, on a support 234 as illustrated in FIGS. 7 and 8. A relay gear 237 is mounted on a tip end of the support link 235. The relay gear 237 is in mesh with an intermediate gear 238 having a pulley portion 239 and a belt 229 is carried by the pulley portions 239 and 233. An electromagnetic mechanism 258 is provided in the vicinity of a base end of the support link 235 as illustrated in FIG. 8. The electromagnetic mechanism 258 is adapted to be energized by signals such as a tape-end signal generated by the reed switch so that the support link 235, which is normally so urged by a spring as to disengage the relay gear 237 from a rack portion 267 formed on a slide member 4, is rotated around 236 from a position shown by a phantom line in FIG. 8 to a position shown by a solid line in FIG. 8 to engage the relay gear 237 with the rack portion 267.

Although the relay gear 237 is so formed as to be provided with multiple geared portions including a geared portion 237a of a small diameter, the gear 237 may be a common one having a single geared portion if the intermediate gear 238 is made so as to have a diameter larger than that of the pulley 239. The intermediate gear 238 may alternatively be driven not via the flywheel 21 but directly by a motor pulley 203. The relay gear 237 etc. may be disposed not on a lower face of the deck 100 as illustrated in FIG. 7 but on an upper face thereof.

In the embodiment as illustrated in FIGS. 7 to 9, the desired ejecting operation can also be effected manually. To attain such a manual ejecting operation, another rack portion 268 facing upwardly is formed at a forward portion of the slide member 4. The rack portion 268 is engaged with an interlocking gear 282 which is mounted on the guide member 5 by a shaft 153. A guide pin 154 is also provided on the guide member 5. A manual ejecting lever 280 is attached to the guide member 5 through guide slots 283 and 284 thereof which are engaged with the shaft 153 and the guide pin 154. A rack portion 281 facing downwardly is formed at a rear portion of the manual ejecting lever 280 so as to engage with the interlocking gear 282 oppositely to the rack portion 268.

Although the embodiment is so formed that the rack portions 268 and 281 are engaged with the interlocking gear 282 having a single geared portion, the gear 282 may have geared portions of different diameters. In this case, one of the geared portions is engaged with the rack portion 268 and another is engaged with the rack portion 281. With this arrangement, a ratio between an operating stroke applied to the operating lever 280 and an actuating stroke provided for the actuating member, i.e., the slide member 4 may be varied so that a large actuating stroke can be obtained from a small operating stroke or a large actuating force can be obtained from a small operating force. Furthermore, the rack portions may advantageously be formed on the same side in parallel with each other instead of being arranged on opposite sides, to obtain the actuating stroke in the same direction as the operating stroke. In this case, if the interlocking gear has a sufficient thickness, that is, the gear is formed cylindrical, a distance in the axial direction of the gear between the engaging positions with the rack portions may be freely selected so as to cope with a variety of spacings between the operating lever 280 and the slide member 4. If desired, the rack portions 268 and 281 may be perpendicular with each other so as to engage with the gear 282 in directions normal to each other. For instance, where the interlocking gear 282 is provided at the corner of the apparatus frame, the rack portions 268 and 281 may engage therewith in the directions perpendicular with each other. In this case, the operating direction of the slide member 4 can be differentiated from that of the operating lever 280. Thus, the present invention can be applied to various types of tape players and adapted for various mounting conditions. In addition, where the spacing between the lever 280 and the member 4 is made variable or the operating direction of the member 4 is differentiated from that of the lever 280, uniform operating efficiency can also be assured and the forces required for the operation at an early stage, intermediate stage and final stage can be uniform.

The operation of the embodiment as mentioned above will now be explained. When a cassette 200 is inserted along the cassette receiving frame 10 with the rear portion raised around the pivotal seat portions 101 and 101a as illustrated in FIGS. 1, 2 and 3, the leading end, i.e., the rear end of the cassette 200 engages with the engaging portion 6a of the slide member 6 to retreat the slide member 6 against the action of the spring 301. The slide member 6 is guided slantingly upwardly along the inclinations of the slots 51 and 53. Simultaneously, the engaging projection 66 engages with the engaging member 40a of the actuating member 40 and pushing the actuating member 40 rearwardly along the guide slot 54. As a result, the operating member, i.e., the slide member 4 connected to the actuating member 40 by the pin 43 is also pushed backwardly against the action of the spring 302. Thus, an energy for ejection is stored in the spring 302. During the retreat of the actuating member 40 and the slide member 4, the actuating member 40 rotates clockwise in the positions as illustrated in FIGS. 2 and 3 by the spring provided between the actuating member 40 and the slide member 4.

As the engaging member 40 retreats to the interior of the fourth guide slot 54, the engaging projection 66 of the slide member 6 is guided slantingly upwardly so that the projection 66 is raised relative to the engaging member 40a and depresses the engaging member 40a into the recessed portion 54b of the guide slot 54 due to a relation between a bent arcuated portion 66a formed at a tip end of the engaging projection 66 and circumferential surface of the engaging member 40a. The engaging member 40 acts on a tip end 77 of the interlocking link 7 positioned within the recessed portion 54b to let the magnetic member contact the electromagnetic mechanism 57 through the interlocking link 7. On the other hand, upon completion of loading of the cassette 200, the leading end, i.e., the rear end of the cassette 200 depresses the switch operating member 126 to close the switch 127 for energizing the electromagnetic mechanism 57. Thus, the magnetic member 58 in contact with the electromagnetic mechanism 57 is held in the position and the engaging member 40 is held by the locking portion 72 to establish locking conditions. After the locking condition has been established, the engaging projection 66 of the slide member 6 passes over the engaging member 40a and retreats until the vertical portion 61a of the first engaging slot 61 of the slide member 6 reaches the pin 117. When the pin 117 is positioned at the vertical portion 61a, the interlocking member 3 rotates clockwise in FIG. 3 around the connecting member 69 to lower the rear portion of the cassette receiving frame 10 onto the deck 100 through the pin 63 for providing a playback position.

When the frame 10 with the cassette held thereon is lowered onto the deck 100, the operating portion 118 of the frame 10 depresses the resilient member 125 so that the projection 120 locked by the locking member 124 of the resilient member 125 is released. As a result, the head plate 13 is advanced by the action of the spring 309 so that the head 1 and the pinch roller 2 are pressed against a tape of the cassette 200 loaded in the playback position. Thus, the tape runs between the pinch roller 2 and a capstan 30 by a motor 31 energized upon closing the switch 127. Since the operation of the head plate 13 is carried out after detection of the cassette 200 set in the playback position by the operating portion 118 and the resilient member 125, the head plate 13 is surely operated at an appropriate timing and there is no fear that the head plate 13 is operated before the cassette 200 has not been set in the playback position. Upon lowering of the frame 10 onto the playback position, the base portion 108 of the operating member 106 raised above the deck 100 is depressed by the bottom of the frame 10. As a result, the forward portion having the opening 106a is moved upwardly to raise the reel base support 210, the reel base 22 on the support 210 and the reel drive member 215 through the locking member 214. More specifically, the reel drive member 215 located at the cassette receiving inlet is adapted to be in a retired position so as not to hinder the cassette 200 at the time of cassette loading and to be raised for engagement with a reel of the cassette 200 when the cassette is set in the position. This mechanism can reduce the thickness of the entire structure.

When the tape comes to an end after completion of reproducing, the electromagnetic mechanism 258 is energized so that the relay gear 237 engages with the intermediate gear 238 and the rack portion 267 to reset the slide member 4 held at the depressed position by the motor 20. As the slide member 4 is being reset, the cam portion 44 causes the head plate 13 to retreat and the locking portion 46 causes the interlocking member 3 to rotate to raise the tape pack receiving frame 10 into the inclined position. At this time, the slide member 6 is moved forwardly to push the cassette 200 outwardly. Upon outward displacement of the cassette 200, the switch operating member 126 is reset to open the power source switch 127 as in the embodiment illustrated in FIGS. 1 to 6. Deenergization of the electromagnetic mechanism 258 releases the relay gear 237 from the aforesaid engagement and holds it in a position of ejection.

In the arrangement of the present embodiment, the manual ejection is carried out as follows. As stated before, the operating lever 280 is drawn out into a standby position for ejection in response to retreat of the slide member 4 caused by depression of the slide member 6 when the cassette 200 is loaded. In this state, if some depressing force is applied to the operating lever 280, the slide member 4 is drawn forwardly through the interlocking gear 282. At the beginning of the forward movement of the slide member 4, the head plate 13 is caused to retire from the playback position by the cam portion 44. Then, the locking portion 46 rotates the L-shaped actuating member 60 counterclockwise to raise the rear portion of the tape pack receiving frame 10 connected through the opening 68 in a manner similar to that in the aforesaid automatic ejecting operation. When the frame 10 is in a completely raised position, the connecting member 69 reaches a top portion of the vertical portion 61a of the first slot 61 and the slide member 6 is reset by a resetting action of the spring 301. By the resetting of the slide member 6, the connecting member 69 is received in the horizontal portion of the slot 61 and the cassette 200 is pushed outwardly by the engaging portion 6a of the slide member 6 to attain the desired ejection.

As stated above, the present invention enables smooth automatic ejecting operation utilizing a motor. There is no need to employ an ejecting spring and to bias the spring against the action of the spring for storing an ejecting energy on the spring as needed in the conventional art. Therefore, smooth and accurate loading of the tape pack into the playback position can be assured even if the tape pack is a small and thin cassette type tape pack. The lock mechanism and components associated therewith may be simple. Since the automatic ejection is carried out by using the gear driver by the motor, special space is not needed and a desired ejection is carried out by a horizontal operation. In addition, an operation of the head and pinch roller required for the ejecting operation and raising operation of the tape pack receiving frame are carried out sequentially, keeping good timings, so that there is no fear that an excessive load is applied all at once. Thus, the invention can attain the aforesaid object by a simple and compact structure.

Further according to the invention, since the lever member having the operating portion and the actuating member for raising and lowering the tape pack receiving frame are interlocked with each other through the respective rack portions and the interlocking gear meshable therewith, the operations of the lever member and the actuating member can be linear, which can improve the space efficiency as compared with the case where a rotating link member is employed. Moreover, the operating efficiency is uniform throughout the ejection operation so that smooth and sure operation can be obtained. The gear may have a plurality of geared portions so as to vary the operating stroke, the operating direction, etc. according to various application conditions.

The present invention may be applied not only to the tape player of slantingly loading type as illustrated but also to a tape player of slot-in type. The gear driving for the automatic ejection may be obtained directly from the motor pulley. The structure as illustrated in FIGS. 7 to 9 may be mounted horizontally above the head.

I claim:

1. An auto-eject mechanism for a magnetic recording/reproducing apparatus which comprises; a tape pack receiving frame; a support structure for said frame which structure supports said frame for movement between a tape pack receiving or ejecting position to a recording/reproducing position within said apparatus, said support structure including rack carrying means interlocked with said frame and movable therewith as said frame is moved from said tape pack receiving position to said recording/reproducing position, first rack means on said rack carrying means, and support means having gear means mounted thereon normally out of engagement with said rack means; motor means for driving said gear means; means for generating a signal at the end of a tape in said tape pack; and electromagnetic means operated by said signal to move said support means to bring said gear means in meshing engagement with said rack means, said gear means being driven by said motor means to drive said rack carrying means in a direction which moves said frame and tape pack carried thereby into said tape pack ejecting position.

2. The mechanism as claimed in claim 1, which further comprises a cam portion formed on said slide member for letting said tape pack receiving frame tilt according to returning of said slide member to eject the tape pack.

3. The mechanism as claimed in claim 1, which further comprises a switch means adapted to be closed and opened in response to loading and unloading of the tape pack, said switch means being connected to said electromagnetic means.

4. The mechanism as claimed in claim 1 which further comprises: a manually operative lever member mounted so as to be slidable; second rack means formed on said lever member; said rack carrying means being an actuating member mounted so as to be slidable for lowering and raising said tape pack receiving frame; third rack means formed on said actuating member; and gear means meshable with said second and third rack means and rotatable as said manually operable lever is manually moved to actuate said actuating member.

5. The mechanism as claimed in claim 4, wherein said gear means has two geared portions of different diameters, one of said geared portions being meshable with said second rack means and another being meshable with said third rack means.

6. The mechanism claimed in claim 4, wherein said second rack means is arranged so as to be perpendicular with said third means.

* * * * *